UNITED STATES PATENT OFFICE.

ANTONIO BASELLI, OF BASEL, SWITZERLAND, ASSIGNOR TO SOCIETY OF CHEMICAL INDUSTRY IN BASLE, OF BASEL, SWITZERLAND.

ALKYL ESTERS OF DIIODO FATTY ACIDS OF HIGH MOLECULAR WEIGHT.

1,024,171.   Specification of Letters Patent.   Patented Apr. 23, 1912.

No Drawing.   Application filed September 12, 1910.   Serial No. 581,711.

*To all whom it may concern:*

Be it known that I, ANTONIO BASELLI, doctor of philosophy and chemist, a subject of the Emperor of Austria-Hungary, and resident of Basel, Switzerland, have invented new and useful Alkyl Esters of Diiodo Fatty Acids of High Molecular Weight, of which the following is a full, clear, and exact specification.

I have found that alkyl esters of di-iodo-fatty acids of high molecular weight possess valuable therapeutic properties. As compared with the known esters of mono-iodo-fatty acids of high molecular weight, which melt at low temperatures or are oily liquids, the esters of di-iodo-fatty acids of high molecular weight have the advantage that they remain solid at temperatures which come into consideration in practice, and in consequence of their marked tendency to crystallize are easily procured in a chemically pure condition. Moreover, the new esters surpass the iodin derivatives of the fatty oils or the fatty acids which have already been used in therapy, by their considerably higher content of iodin. These new esters corresponding to the general formula $C_nH_{2n-3}I_2.COO$. alkyl may be manufactured by treating the unsaturated di-iodo-fatty acids of high molecular weight with esterifying agents.

The following examples illustrate the invention, the parts being by weight:

Example 1: 50 parts of di-iodo-brassidic acid are suspended in 250 parts of methyl alcohol and into the mixture dry hydrogen chlorid is introduced, while cooling and stirring well, until the liquid is saturated with the gas. The di-iodo-brassidic acid passes into solution whereupon crystallization of the methyl ester occurs. After standing for a short time, the mass is heated also for a short time, on the water bath, whereby the ester is caused to settle as a heavy oil and can easily be separated from the alcoholic solution of hydrogen chlorid. By recrystallization of the crude products from alcohol, the methyl ester of di-iodo-brassidic acid is obtained as long, lustrous, colorless needles which melt at 47–48° C.

The ethyl ester of di-iodo-brassidic acid forms colorless silky needles, melts at 37°–38° C. and corresponds to the formula $C_{21}H_{39}I_2.COO.C_2H_5$.

Example 2: 10 parts of di-iodo-brassidic acid are dissolved in 50 parts of alcohol with addition of the theoretical proportion of caustic potash, the solution is mixed with 4 parts of iso-amylene bromid and the mixture is heated to boiling for 6 hours in a reflux apparatus. The iso-amyl ester of di-iodo-brassidic acid thus obtained may be re-crystallized from alcohol, whereby it yields flat, silky needles which melt at 57–58° C.

Example 3: 10 parts of di-iodo-elaidic acid are dissolved in 40 parts of alcohol of 70–80 per cent. strength with addition of the theoretically necessary proportion of caustic potash; 4 parts of dimethyl sulfate are added and the mixture is warmed for a short time on the water bath. The methyl ester of di-iodo-elaidic acid separates as a heavy oil. After recrystallization from alcohol the ester forms colorless, lustrous laminæ melting at 34° C.

The described alkyl esters of di-iodo-fatty acids of high molecular weight can also be prepared by causing two atomic proportions of iodin to act on alkyl esters of unsaturated fatty acids of high molecular weight.

What I claim is:

1. As new products, the alkyl esters of di-iodo-fatty acids of high molecular weight corresponding to the general formula $C_nH_{2n-3}I_2.COO$. alkyl forming colorless crystals insoluble in water, but soluble in alcohol and remaining solid at temperatures which come into consideration in practice.

2. As a new product, the ethyl ester of di-iodo-brassidic acid corresponding to the formula $C_{21}H_{39}I_2.COO.C_2H_5$, forming colorless silky needles which melt at 37–38° C., being insoluble in water and difficultly soluble in cold alcohol but easily soluble in hot alcohol.

In witness whereof I have hereunto signed my name this 30th day of August 1910, in the presence of two subscribing witnesses.

ANTONIO BASELLI.

Witnesses:
 GEO. GIFFORD,
 AMAND RITTER.